US011878511B2

(12) United States Patent
Aizawa

(10) Patent No.: US 11,878,511 B2
(45) **Date of Patent: *Jan. 23, 2024**

(54) INK JET PRINTING SYSTEM

(71) Applicant: Seiko Epson Corporation, Tokyo (JP)

(72) Inventor: Tadashi Aizawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 5 days.

This patent is subject to a terminal disclaimer.

(21) Appl. No.: 17/650,279

(22) Filed: Feb. 8, 2022

(65) Prior Publication Data

US 2022/0161573 A1 May 26, 2022

Related U.S. Application Data

(63) Continuation of application No. 16/913,551, filed on Jun. 26, 2020, now Pat. No. 11,241,878.

(30) Foreign Application Priority Data

Jun. 28, 2019 (JP) ................................ 2019-121933

(51) Int. Cl.
*B41J 11/00* (2006.01)
*B41J 2/01* (2006.01)
(Continued)

(52) U.S. Cl.
CPC ........... *B41J 11/00216* (2021.01); *B41J 2/01* (2013.01); *B41J 3/60* (2013.01); *B41J 11/002* (2013.01);
(Continued)

(58) Field of Classification Search
CPC ...... B41J 2/01; B41J 11/002; B41J 11/00218; F26B 3/347
See application file for complete search history.

(56) References Cited

U.S. PATENT DOCUMENTS 9,259,949 B2 * 2/2016 Otsuka ..................... B41J 19/30
2014/0354743 A1 12/2014 Tsuchiya
2017/0266986 A1 9/2017 Yamada

FOREIGN PATENT DOCUMENTS

JP 2010-125618 6/2010
JP 2014-231161 12/2014
(Continued)

OTHER PUBLICATIONS

Asamura, Naoya, Electromagnetic Wave Propogation Instrument, Jan. 11, 2007, Japan, All (Year: 2007).*

*Primary Examiner* — Justin Seo
*Assistant Examiner* — Tracey M McMillion
(74) *Attorney, Agent, or Firm* — WORKMAN NYDEGGER

(57) ABSTRACT

Provided is an ink jet printer including: an electromagnetic wave generator that includes an electromagnetic wave generation section, a high-frequency voltage generation section generating a voltage applied to the electromagnetic wave generation section, and a transmission line coupling the electromagnetic wave generation section and the high-frequency voltage generation section to each other in which the electromagnetic wave generation section includes a first electrode, a second electrode, a first conductor that couples the first electrode and the transmission line to each other, and a second conductor that couples the second electrode and the transmission line to each other, a minimum separation distance between the first conductor and the second conductor is 1⁄10 or less of a wavelength of an output electromagnetic wave, and the first conductor includes a coil, and the coil is disposed at a position closer to the first electrode than the transmission line; a carriage that reciprocates in a width direction of a recording medium; and an ink jet head, in which a thin ink film of the ink discharged from the ink jet
(Continued)

head and attached to the recording medium is dried by the electromagnetic wave generator.

7 Claims, 7 Drawing Sheets

(51) Int. Cl.
*F26B 3/347* (2006.01)
*H05B 6/62* (2006.01)
*B41J 3/60* (2006.01)

(52) U.S. Cl.
CPC ......... *B41J 11/00218* (2021.01); *F26B 3/347* (2013.01); *H05B 6/62* (2013.01)

(56) References Cited

FOREIGN PATENT DOCUMENTS

| | | |
|---|---|---|
| JP | 2017-165000 | 9/2017 |
| JP | 2017-223384 | 12/2017 |
| JP | 2019-053959 | 4/2019 |

* cited by examiner

INK JET PRINTING SYSTEM

The present application is a continuation of U.S. application Ser. No. 16/913,551, filed Jun. 26, 2020, which claims priority to JP Application No. 2019-121933, filed Jun. 28, 2019, the disclosures of which are hereby incorporated by reference herein in their entireties.

BACKGROUND

1. Technical Field

The present disclosure relates to an ink jet printer.

2. Related Art

Various types of ink jet recording devices have been developed. For example, a technology for printing on a medium to which ink is unlikely to permeate, such as a film or a metal sheet, has been developed. When ink is attached to such a medium that hardly absorbs ink, for awhile after the attachment, the ink droplets can flow on the medium, and color mixing between dots and bleeding of an image is likely to occur. As one of the measures for suppressing such a phenomenon, it is conceivable to dry the ink in as short a time as possible after the attachment of the ink droplet.

As a method for drying ink, for example, it is conceivable to apply a heated solid to the back surface of the medium and dry a film of ink droplets attached to the surface by heat conduction but the energy required for this is very large, and it takes time for the heat to be conducted, which is not always the optimal method. Further, as another method, in a drying device described in JP-A-2017-165000, an attempt has been made to dry ink by applying an AC electric field to the medium and dielectrically heating the attached ink.

However, in the device described in JP-A-2017-165000, a grounded conductor rod and a conductor rod for applying a high-frequency voltage to both ends are arranged in parallel and separated from each other, so that a high-frequency radiation device such as a loop antenna is used. From such a radiation device, electromagnetic waves are radiated over a relatively wide range due to the characteristics of the antenna. Therefore, a large amount of power is radiated in addition to the power supplied to the ink film to be heated, and it is considered that energy efficiency is low and it is necessary to shield diverging electromagnetic waves. Further, depending on the printing pattern, there is an area where ink does not exist, and although this exists intricately with an area where ink exists, the electromagnetic waves are also injected into such an area, resulting in poor energy efficiency.

SUMMARY

An ink jet printer according to an aspect of the present disclosure includes: an electromagnetic wave generator that includes an electromagnetic wave generation section that generates an electromagnetic wave, a high-frequency voltage generation section that generates a voltage applied to the electromagnetic wave generation section, and a transmission line that electrically couples the electromagnetic wave generation section and the high-frequency voltage generation section to each other in which the electromagnetic wave generation section includes a first electrode, a second electrode, a first conductor that electrically couples the first electrode and the transmission line to each other, and a second conductor that electrically couples the second electrode and the transmission line to each other, one of the first electrode or the second electrode is a reference potential electrode to which a reference potential is applied and the other is a high-frequency electrode to which a high-frequency voltage is applied, a minimum separation distance between the first electrode and the second electrode is 1/10 or less of a wavelength of an output electromagnetic wave, a minimum separation distance between the first conductor and the second conductor is 1/10 or less of a wavelength of an output electromagnetic wave, and the first conductor further includes a coil, and the coil is disposed at a position closer to the first electrode than the transmission line; a carriage that reciprocates in a width direction of a recording medium; and an ink jet head that discharges ink, in which the electromagnetic wave generator and the ink jet head are mounted on the carriage, and a thin ink film of the ink discharged from the inkjet head and attached to the recording medium is dried by the electromagnetic wave generator.

In the ink jet printer according to the aspect, the electromagnetic wave generator may be disposed on one side or both sides of the ink jet head in a moving direction of the carriage.

In the ink jet printer according to the aspect, a plurality of the electromagnetic wave generators may be further included, in which the electromagnetic wave generators may be arranged side by side in the moving direction of the carriage.

In the ink jet printer according to the aspect, a plurality of the electromagnetic wave generators may be further included, in which the electromagnetic wave generators may be arranged side by side in a direction intersecting the moving direction of the carriage.

In the ink jet printer according to the aspect, the electromagnetic wave generators may be arranged side by side in the direction intersecting the moving direction of the carriage, and are arranged at an interval of 0.2 times or more a length of the electromagnetic wave generator in the direction.

In the ink jet printer according to the aspect, disposing the recording medium at a predetermined position by moving the recording medium, and discharging the ink from the ink jet head and attaching the ink to a predetermined position on the recording medium while scanning the carriage in a direction intersecting a moving direction of the recording medium, may be repeated a plurality of times to form a predetermined image on the recording medium, and when the image is formed, in the scanning, an area where the ink is not dried by the electromagnetic wave generator may be formed, and in another scanning, the ink in the area may be dried by the electromagnetic wave generator, and the electromagnetic wave generator may pass through an entire surface of the image by scanning the carriage two or more times.

DESCRIPTION OF EXEMPLARY EMBODIMENTS

An embodiment of the present disclosure will be described below. The embodiment described below describes an example of the present disclosure. The present disclosure is not limited to the following embodiment at all, and includes various modifications implemented without departing from the spirit of the present disclosure. Note that not all of the configurations described below are essential configurations of the present disclosure.

1. Ink Jet Printer

An ink jet printer according to the present embodiment includes a first electrode and a second electrode, and includes an electromagnetic wave generator in which a coil is connected in series to the first electrode or the second electrode, a carriage, and an ink jet head. The carriage has the electromagnetic wave generator and the ink jet head mounted thereon, and a thin ink film of ink discharged from the ink jet head and attached to a recording medium is dried by the electromagnetic wave generator. Hereinafter, the electromagnetic wave generator, the carriage, and the ink jet head will be described in this order.

1.1. Electromagnetic Wave Generator

The electromagnetic wave generator of the present embodiment includes an electromagnetic wave generation section that generates an electromagnetic wave, a high-frequency voltage generation section that generates a voltage applied to the electromagnetic wave generation section, and a transmission line for electrically coupling the electromagnetic wave generation section and the high-frequency voltage generation section to each other. The electromagnetic wave generation section includes a first electrode, a second electrode, a first conductor for electrically coupling the first electrode and the transmission line to each other, and a second conductor for electrically coupling the second electrode and the transmission line to each other. Further, the first conductor includes a coil, and the coil is provided at a position closer to the first electrode than the transmission line.

Figure 1:
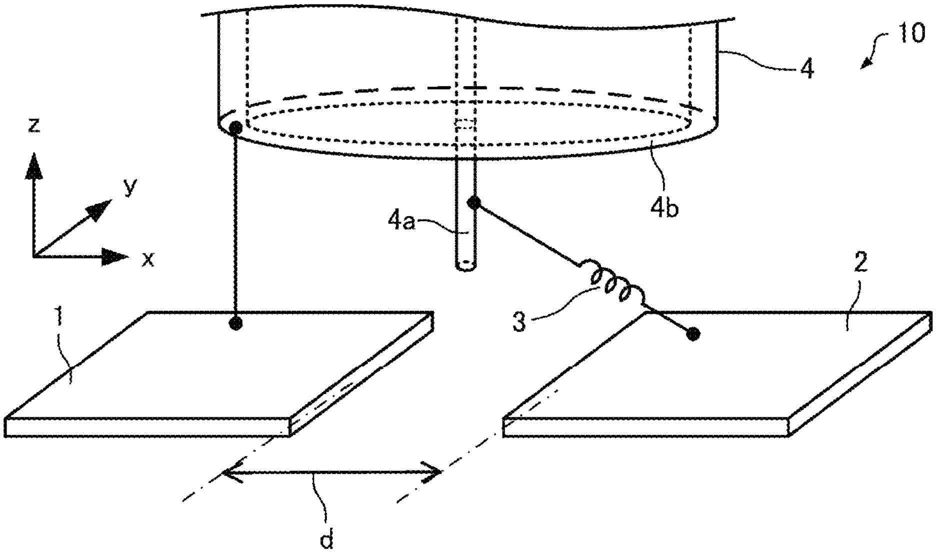
FIG. 1 is a schematic diagram showing the vicinity of an electrode of an electromagnetic wave generator according to an embodiment.
Figure 2:
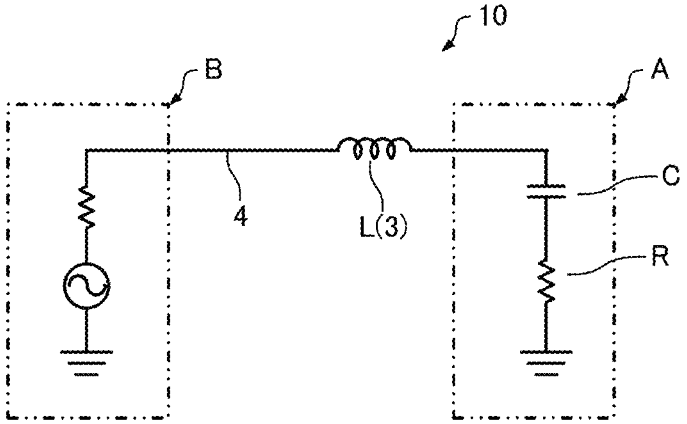
FIG. 2 is an equivalent circuit diagram of the electromagnetic wave generator according to the embodiment.

Therefore, the electromagnetic wave generator of the present embodiment includes at least a first electrode, a second electrode, and a coil. FIG. 1 is a schematic diagram showing the vicinity of the electrode of the electromagnetic wave generator 10 according to an embodiment. FIG. 2 is an equivalent circuit diagram of the electromagnetic wave generator 10. The electromagnetic wave generator 10 includes an electromagnetic wave generation section including a first electrode 1, a second electrode 2, and a coil 3, a coaxial cable 4 as a transmission line, and a high-frequency source as a high-frequency voltage generation section.

Regarding the coil mentioned here, even with the same inductance, a heating energy efficiency of an ink film greatly differs depending on a position where the coil is inserted in series, and it is desirable to install the coil as close to the electrode as possible. The coil 3 may be omitted by giving the electrode itself an inductance by, for example, forming the first electrode or the second electrode in a meander shape.

1.1.1 Electrode

The electromagnetic wave generator 10 includes a first electrode 1 and a second electrode 2. The first electrode 1 and the second electrode 2 have conductivity. A reference potential is applied to one of the first electrode 1 and the second electrode 2. A high-frequency voltage is applied to the other of the first electrode 1 and the second electrode 2. The method of selecting the first electrode 1 and the second electrode 2 can be any methods. The reference potential is applied to one of the two electrodes, and a high-frequency voltage is applied to the other. In this specification, an electrode to which a reference potential is applied may be referred to as a "reference potential electrode", and an electrode to which a high-frequency voltage is applied may be referred to as a "high-frequency electrode".

The reference potential is a constant potential serving as a reference for a high-frequency voltage, and may be, for example, a ground potential. As a special example, if an output of the high-frequency voltage generation circuit that generates a high-frequency voltage to be input to the electromagnetic wave generator 10 is a differential circuit, there is no distinction between the first electrode 1 and the second electrode 2. As for a frequency of the high-frequency, there is a heating effect when the frequency is 1 MHz or more, but since a dielectric loss tangent becomes a maximum around 20 GHz, the heating efficiency also becomes the maximum therearound. In particular, from the viewpoint of heating water, the bandwidth is desirably 2.0 GHz or more and 3.0 GHz or less, and from a legal viewpoint, a 2.4 GHz bandwidth, which is one of the ISM bandwidth, is desirable, for example, 2.44 GHz or more and 2.45 GHz or less. The higher the high-frequency voltage, the greater the amount of heat supplied to the ink. However, since the voltage is normally transmitted to the electromagnetic wave generator 10 through a 50Ω transmission line, at the high-frequency voltage input of the electromagnetic wave generator 10, a voltage is represented by "high-frequency power=V ^2/R=V ^2/50". Furthermore, in order to suppress the amount of heat generated by the parasitic resistance of the electromagnetic wave generator 10, the power per electromagnetic wave generator 10 is set to about 10W, and it is desirable to use a plurality of electromagnetic wave generators 10 to ensure the power required for drying the ink. Further, the ink is heated by dielectric heating due to an electric field generated between the first electrode 1 and the second electrode 2. The electric field at this time has a value of about 1×10^6 V/m. Further, the ink is heated by dielectric heating due to an electric field generated between the first electrode 1 and the second electrode 2. At this time, the electric field between the first electrode and the second electrode has a value of about 1×10^6 V/m by the effect of the coil 3 or the distance between the electrodes.

Figure 6:
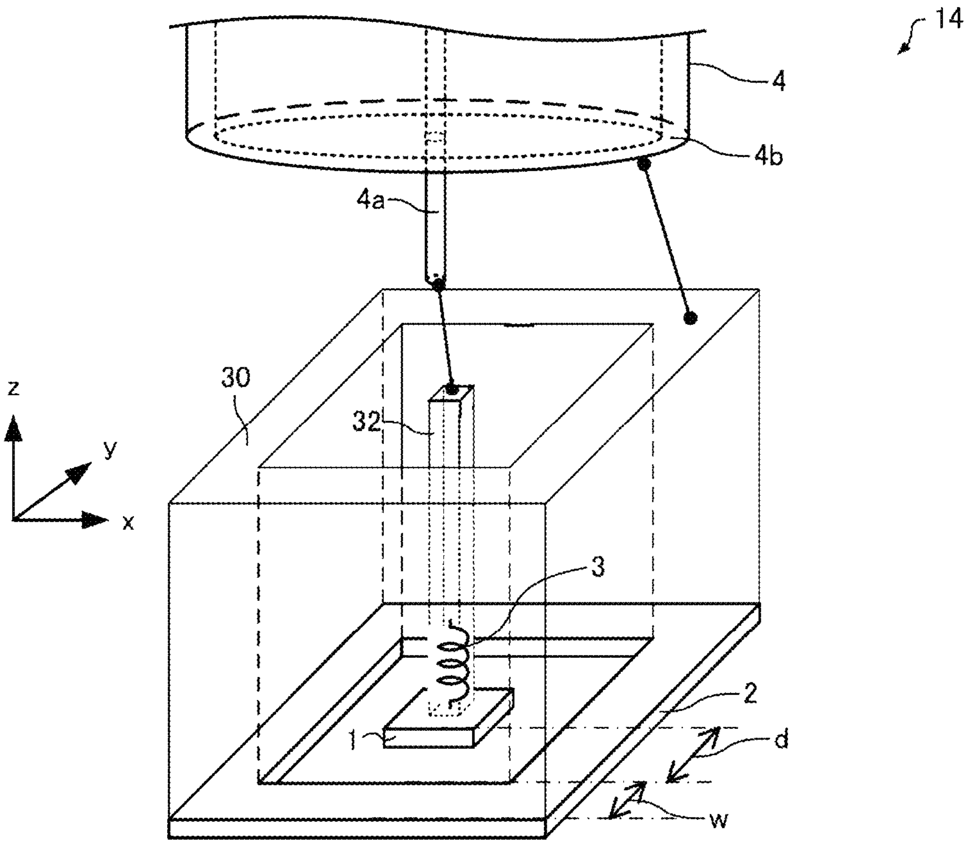
FIG. 6 is a schematic diagram showing the vicinity of an electrode of the electromagnetic wave generator according to the embodiment.

The application of the high-frequency voltage means that the central portion of a surface of the first electrode 1 or the second electrode 2 opposite to a surface facing the ink is set to a feeding point, and the power of the above described high-frequency voltage is supplied to this feeding point. Incidentally, as shown in FIG. 6, which will be described later, a coating portion of the coaxial cable may be connected to the electrode with a metal surface.

In the illustrated example, the first electrode 1 and the second electrode 2 have a flat plate shape. The plane shape of the first electrode 1 and the second electrode 2 can be any shapes, and may be, for example, a square, a rectangle, a circle, or a combination of these shapes. In the illustrated example, the first electrode 1 and the second electrode 2 have a substantially square shape in plan view. The plane size of the first electrode 1 and the second electrode 2 is 0.01 $cm^2$ or more and 100.0 $cm^2$ or less, desirably 0.1 $cm^2$ or more and 10.0 $cm^2$ or less, more desirably 0.5 $cm^2$ or more and 2.0 $cm^2$ or less, and further desirably 0.5 $cm^2$ or more and 1.0 $cm^2$ or less on one electrode, as an area in plan view. The areas of the first electrode 1 and the second electrode 2 in plan view may be the same or different. The plan view refers to a state viewed from the z direction in FIG. 1.

It is desirable that the first electrode 1 and the second electrode 2 are disposed so as not to overlap with each other in plan view. In the illustrated example, the first electrode 1 and the second electrode are disposed in parallel on the same plane. With such a disposition, a predetermined electromagnetic wave can be generated efficiently. The shapes and dispositions of the first electrode 1 and the second electrode 2 will be further described later. The details of the generated electromagnetic waves will be described later.

The first electrode 1 and the second electrode 2 are formed of a conductor. Examples of the conductor include metals, alloys, and conductive oxides. The first electrode 1 and the second electrode 2 may be the same material or different materials. The first electrode 1 and the second electrode 2 may be appropriately formed by selecting the thickness or strength so that the first electrode 1 and the second electrode 2 can be self-supporting, or can be formed on a surface of a substrate or the like made of a material (not shown) having a low dielectric loss tangent that transmits electromagnetic waves when it is difficult to maintain the strength of the first electrode 1 and the second electrode 2.

Each of the first electrode 1 and the second electrode 2 are electrically coupled to a coaxial cable 4 coupled to the high-frequency source via an inner conductor 4*a* and an outer conductor 4*b*, as schematically shown in FIG. 1. The inner conductor 4*a* is disposed on a surface of the first electrode 1 opposite to a surface facing the thin ink film, and the outer conductor 4*b* is disposed on a surface of the second electrode 2 opposite to a surface facing the thin ink film. In other words, the first electrode 1 and the second electrode 2 are disposed closer to the thin ink film than the inner conductor 4*a* and the outer conductor 4*b*.

1.1.2. Electrode Interval

The minimum separation distance d between the first electrode 1 and the second electrode 2 is 1/10 or less of the wavelength of the electromagnetic wave output from the electromagnetic wave generator 10. For example, when the frequency of the electromagnetic wave output from the electromagnetic wave generator 10 is 2.45 GHz, the wavelength of the high-frequency is substantially 12.2 cm, and in this case, the minimum separation distance between the first electrode 1 and the second electrode 2 is substantially 1.22 cm or less. In the example in FIG. 1, the coil 3 is provided on the internal conductor 4*a*. The distance between the coil 3 and the first electrode 1 in the transmission line of the inner conductor 4*a* is desirably shorter than the distance between the coil 3 and the coaxial cable 4. Normally, the coil 3 is coupled only to the first electrode, but can be coupled only to the second electrode or to both the first electrode and the second electrode.

By setting the minimum separation distance d between the first electrode 1 and the second electrode 2 to be 1/10 or less of the wavelength of the output electromagnetic wave, most of the electromagnetic waves generated when a high-frequency voltage is applied can be attenuated near the first electrode 1 and the second electrode 2. Thereby, the intensity of the electromagnetic wave reaching the distant place from the first electrode 1 and the second electrode 2 can be reduced.

That is, the electromagnetic wave radiated from the electromagnetic wave generator 10 is very strong near the first electrode 1 and the second electrode 2 and very weak far from the first electrode 1 and the second electrode 2. In this specification, an electromagnetic field generated by the electromagnetic wave generator 10 near the first electrode 1 and the second electrode 2 may be referred to as a "near electromagnetic field". Further, in this specification, an electromagnetic field generated by a general antenna (antenna) for transmitting electromagnetic waves to a distant place may be referred to as a "distant electromagnetic field". Note that the boundary between the near and far distances is a position separated from the electromagnetic wave generator 10 by substantially 1/6 of the wavelength of the generated electromagnetic wave.

The electromagnetic wave generator 10 is used for applications such as televisions and mobile phones, and is not an electromagnetic wave generator that transmits electromagnetic waves at intervals of m units. Instead, the electromagnetic wave generator 10 is an electromagnetic wave generator in which during the transmission of the distance of 1/6 of the wavelength of the generated electromagnetic wave, the electric field density of the electromagnetic wave is attenuated to 30% or less of the electric field density between the first electrode 1 and the second electrode 2. That is, the electromagnetic wave generator 10 is not suitable for a communication. Furthermore, since the electromagnetic wave generated by the electromagnetic wave generator 10 has a high attenuation rate, the range of the electric field is suppressed. Therefore, unnecessary radiation hardly occurs in an area farther from the device than the distance of substantially the wavelength of the generated electromagnetic wave. Therefore, it is unnecessary or easy to comply with regulations by the Radio Law and the like, and even when compliance is required, it is possible to reduce the scattering of electromagnetic waves around the electromagnetic wave generator by a simple electromagnetic wave shield or the like. Such properties of the electromagnetic wave generator 10 are caused by the small size of the electrodes, the short distance between the electrodes, the difficulty of resonance, and the like.

In other words, the electromagnetic wave generator 10 of the present embodiment is not a device for generating a distant electromagnetic field such as a dipole antenna, but is equivalent to a slot antenna where the negative/positive is inverted with respect to the dipole antenna and the slot width is made sufficiently small with respect to the wavelength to make it difficult to generate distant electromagnetic fields. The present structure only generates an electric field like a capacitor, and this electric field does not generate a magnetic field as a secondary matter. Therefore, a so-called distant electromagnetic field in which an electric field and a magnetic field are generated in a chain and an electromagnetic wave is transmitted to a distant place is not generated.

1.1.3. Coil

The electromagnetic wave generator 10 includes a coil 3, and the coil 3 is coupled to the first electrode 1 or the second electrode 2 in series, and coupled as close to the first electrode 1 or the second electrode 2 as possible. The first electrode 1 or the second electrode 2 is coupled to a path to which a high-frequency voltage is applied via the coil 3.

The coil 3 is installed for three purposes: matching, increasing an electric field generated between electrodes, and enhancing by adding an electric field generated by a coil to an electric field generated between electrodes.

Role of Coil (1): Matching

Generally, a voltage applied to an antenna is transmitted to the antenna via a coaxial cable (for example, a characteristic impedance of 50Ω). It is desirable that the impedance of the antenna matches the impedance of the high-frequency voltage generation circuit or the impedance of the coaxial cable transmitted from the circuit to the antenna. By matching or approaching the impedance of the antenna to the impedance of a cable or the like, the energy transmission efficiency is improved. Conversely, when a high-frequency voltage of a sine wave is input to the antenna and the impedance of the high-frequency voltage generation circuit does not match the impedance of the antenna, signal reflection occurs at a discontinuous place of impedance, and it is difficult to input a signal to the antenna. Therefore, at the coupling place between the antenna and the coaxial cable where impedance discontinuity is likely to occur, a matching circuit constituted by a coil and a capacitor is inserted, the impedance of the antenna is adjusted, and the energy transmission efficiency improvement is performed between the inner conductor of the coaxial cable and the electrode of the antenna, or between the outer conductor and the electrode of the antenna. The coaxial cable is normally 50Ω, and the matching circuit is adjusted so that the antenna also has 50Ω. If the coaxial cable has an imaginary impedance, the antenna is adjusted to an imaginary impedance conjugate to the imaginary impedance. Such a coil is called a so-called matching coil.

Role of Coil (2): Increasing Electric Field Density Between Electrodes

FIG. 2 is an equivalent circuit of the ink dryer. The electromagnetic wave generation circuit A corresponds to the electromagnetic wave generator 10. The capacitor C of the electromagnetic wave generation circuit A corresponds to the first electrode 1 and the second electrode 2, and the resistance R of the electromagnetic wave generation circuit A corresponds to the radiation resistance of the radiated electromagnetic wave. The high-frequency source corresponds to the high-frequency voltage generation circuit B, and the resistance R of the high-frequency voltage generation circuit B is an internal resistance of the high-frequency voltage source. The coil L inserted between the high-frequency voltage generation circuit B and the electromagnetic wave generation circuit A corresponds to the coil 3 coupled to the first electrode 1 or the second electrode 2 in series.

As described above, since the electromagnetic wave generating circuit A includes the capacitor C, a specific resonance frequency can be obtained by coupling the coil L so as to be in series with the capacitor C. Further, when the inductance of the coil L is increased and the capacitance of the capacitor C is reduced as much as possible, the transmission efficiency is improved. The inductance of the coil L and the capacity of the capacitor C are appropriately designed.

The radiation resistance is smaller (for example, substantially 7Ω) than the impedance of the coaxial cable 4 (for example, 50Ω), and the capacity of the capacitor C apparently formed by the first electrode 1 and the second electrode 2 is, for example, substantially 0.5 pF.

In the electromagnetic wave generator 10, when it is assumed that the plane shape of the first electrode 1 and the second electrode 2 is a square of 5 mm×5 mm, the minimum separation distance is 5 mm, and a 10 nH coil L is coupled to the second electrode 2 in series, and in a case where a voltage of 1 V is generated from the high-frequency voltage generation circuit B as shown in FIG. 2, it is known from a simulation that the voltage applied to the antenna terminal (the voltage applied between the point on the L side of C and GND) is substantially 2 V. The resistance R indicates the radiation resistance of the antenna. Further, it is also known that higher voltages are applied to the antenna as the inductance of the coil increases. By thus inserting a coil in series between the antenna constituted by the first electrode 1 and the second electrode 2 and the coaxial cable, the voltage between the antenna electrodes can be increased. Thereby, the electric field between the first electrode 1 and the second electrode 2 becomes stronger. The stronger the electric field is applied to the ink, the more efficiently the ink is heated.

Figure 3:
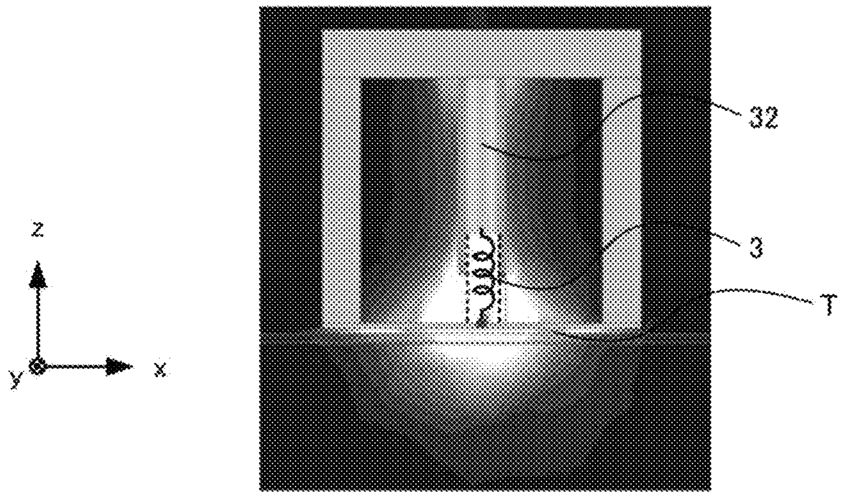
FIG. 3 shows an electric field density distribution when a coil is disposed near an electrode according to the embodiment.
Figure 4:
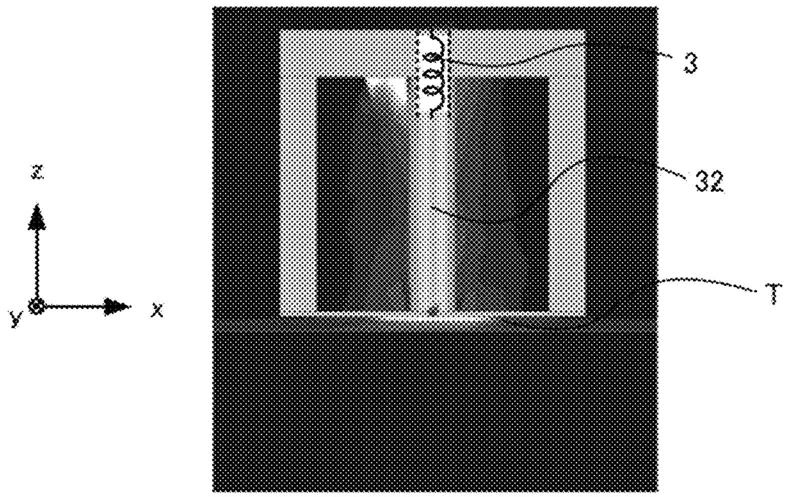
FIG. 4 shows an electric field density distribution when a coil is disposed in a distant place of an electrode according to the embodiment.

Role of Coil (3): Adding an Electric Field Generated by a Coil to an Electric Field Generated Between Electrodes to Enhance the Electric Field The coil 3 is typically configured as a winding of a long electric wire of metal such as copper, which has a parasitic resistance as well as an inductance component. For example, when the inductance component is substantially 30 nH, the parasitic resistance is normally substantially 3Ω. Due to the inductance and the internal resistance, a potential difference is generated at both ends of the coil, and an electric field is generated at a place where the potential difference exists. FIG. 3 shows the results of a simulation of the electric field density distribution when the coil 3 is disposed in contact with the first electrode, and FIG. 4 shows the results of simulation of the electric field density distribution when the coil 3 is separated from the first electrode by substantially 4 mm. The electric field density in FIGS. 3 and 4 represent a higher value as the color approaches black to white. When a coil is installed in the immediate vicinity of the first electrode 1 as shown in FIG. 3, all of the increased voltages shown in the above "role of coil (2)" are applied to the first electrode, and a strong electric field is generated near the first electrode 1. Furthermore, when the direction of the electric field of the coil 3 and the direction of the electric field generated between the first electrode 1 and the second electrode 2 match, the electric field generated in the coil 3 overlaps with the electric field generated between the first electrode and the second electrode, thereby the electric field near the first electrode 1 is made stronger. In contrast to this, when the coil 3 in FIG. 4 is separated from the first electrode, the increased voltage shown in the above "role of coil (2)" is applied to the conductor 32 and the first electrode 1, and the electric field cannot be concentrated near the first electrode 1 where a strong electric field is required. At the same time, a strong unnecessary electric field is generated around the coil 3 distant from the first electrode 1 which does not require a strong electric field. In the structure shown in FIG. 3 and the structure shown in FIG. 4, in this example, the heating efficiency of the thin ink film T is 70% in the former case and substantially 8% in the latter case, thereby big difference occurs, and it is more effective to dispose the coil 3 as close as possible to the first electrode 1. For this purpose, it is possible to make the shape of the first electrode, for example, a meander shape to have an inductance, and to make the first electrode itself a coil, and omit the coil 3.

1.1.4. Variation of Disposition and Structure of Electrode

Figure 5:
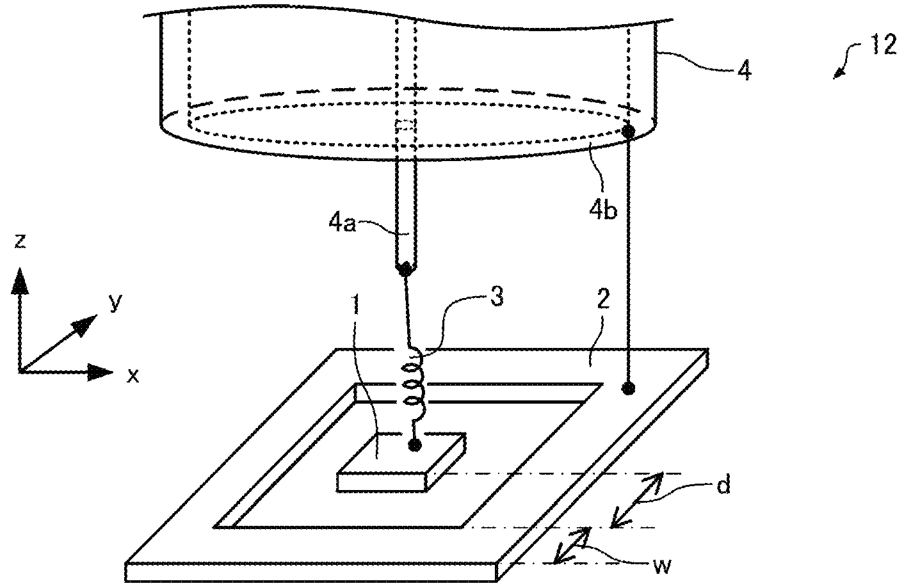
FIG. 5 is a schematic diagram showing the vicinity of an electrode of the electromagnetic wave generator according to the embodiment.

The electromagnetic wave generator may have a structure in which one of the first electrode 1 and the second electrode 2 is disposed so as to surround the other, as the electromagnetic wave generator 12 shown in FIG. 5. FIG. 5 is a schematic diagram showing the vicinity of the electrodes of the electromagnetic wave generator 12. In the electromagnetic wave generator 12, the first electrode 1 surrounds the second electrode 2. The first electrode 1 of the electromagnetic wave generator 12 has a square shape in plan view. In the electromagnetic wave generator 12, the second electrode 2 has a hollow square shape in plan view. Although not shown, the shape of the first electrode 1 may be circular in plan view, and the shape of the second electrode 2 may be a ring or a hollow hexagon in plan view. The plane or spatial positional relationship between the first electrode 1 and the second electrode 2 and the structure of the coil 3 are the same as those of the above-described electromagnetic wave generator 10, and thus the description will be simplified.

In the electromagnetic wave generator 12, a high-frequency potential and a reference potential are fed to the rectangular first electrode 1 disposed at the center in plan view and the second electrodes 2 surrounding the first electrode 1, respectively. The coil 3 is inserted between the first electrode 1 and the inner conductor 4*a* of the coaxial cable 4, and it is important that the coil 3 is positioned as close to the first electrode 1 as possible.

In the electromagnetic wave generator 12, when the shape of the second electrode 2 is a hollow rectangle in plan view, the length of one side of the outer periphery is, for example, 0.1 cm or more and 10.0 cm or less, desirably 0.3 cm or more and 5.0 cm or less, and more desirably 0.4 cm or more and 1.0 cm or less. Further, in this case, the width of the second electrode 2 in plan view is 1.0 mm or more and 2.0 mm or less, desirably 1.4 mm or more and 1.6 mm or less, and more desirably substantially 1.5 mm.

In the electromagnetic wave generator 12, the minimum separation distance d between the first electrode 1 and the second electrode 2 is 1/10 or less of the wavelength of the electromagnetic wave output from the electromagnetic wave generator 12.

In the electromagnetic wave generator, as in the electromagnetic wave generator 14 shown in FIG. 6, one electrode may continuously surround the other electrode and may be coupled to the outer conductor of the coaxial cable via a continuous conductor, or the other electrode may be coupled to the inner conductor of the coaxial cable. FIG. 6 is a schematic diagram showing the vicinity of the electrodes of the electromagnetic wave generator 14. In the electromagnetic wave generator 14, the inner conductor 4*a* of the coaxial cable 4 is coupled to the first electrode 1 via the columnar conductor 32, and the outer conductor 4*b* of the coaxial cable 4 is coupled to the second electrode 2 via the conductor 30. The conductor 30 continuously surrounds the periphery of the conductor 32.

The plane shape and disposition of the first electrode 1 and the second electrode 2 of the electromagnetic wave generator 14 are the same as those of the electromagnetic wave generator 12.

In the electromagnetic wave generator 14, the minimum separation distance d between the first electrode 1 and the second electrode 2 is 1/10 or less of the wavelength of the electromagnetic wave output from the electromagnetic wave generator 12.

Although not shown, in the electromagnetic wave generator 14, the conductor 30 may be integral with the second electrode 2. In this case, the conductor 30 becomes the second electrode 2. Similarly, the first electrode 1 of the electromagnetic wave generator 14 may be integrated with the columnar conductor 32. In this case, the conductor 32 becomes the first electrode 1.

In the electromagnetic wave generator 14, the second electrode 2 is a reference potential electrode, and the first electrode 1 is a high-frequency electrode. With the structure in which the high-frequency electrode is coupled to the inner conductor 4*a* of the coaxial cable 4 and the reference potential electrode is coupled to the outer conductor 4*b* of the coaxial cable 4 via a conductor, the electromagnetic wave generator 14 has a structure similar to a coaxial cable. Therefore, the manufacturing becomes easier. Further, in the electromagnetic wave generator 14, the heating efficiency of the thin ink film is improved.

In the electromagnetic wave generator 14, the second electrode 2 is a reference potential electrode, and the first electrode 1 is a high-frequency electrode. Furthermore, when the conductor 30 coupled to the reference potential electrode continuously surrounds the conductor 32 coupled to the high-frequency electrode, the shield effect by the reference potential electrode is obtained, and the electromagnetic wave is less likely to leak outside the reference potential electrode. Further, a transmission mode is formed near the electrode, so that the thin ink film can be sufficiently irradiated with electromagnetic waves even when the distance between the thin ink film and the electrode is large.

In the electromagnetic wave generator 14, the width w of the second electrode 2 in plan view is 1.0 mm or more and 2.0 mm or less, desirably 1.4 mm or more and 1.6 mm or less. With such a structure, the heating efficiency of the thin ink film can be increased. Furthermore, the shape of the first electrode 1 in a plan view is desirably a rectangular shape (not shown) as compared with a square shape, for example, a rectangular shape of 0.5 mm×5.0 mm. With such a structure, the heating efficiency can be increased.

In each of the electromagnetic wave generators 12 and 14, the minimum separation distance d between the first electrode 1 and the second electrode 2 is 1/10 or less of the wavelength of the output electromagnetic wave, and since the coil 3 is coupled to the second electrode 2 in series, an electromagnetic field can be efficiently generated near the device.

1.1.5. High-Frequency Source

The electromagnetic wave generator according to the present embodiment includes a high-frequency source. The high-frequency source includes the high-frequency voltage generation circuit B described above. The high-frequency source generates a high-frequency voltage applied to the first electrode 1 and the second electrode 2. The high-frequency source includes, for example, a quartz crystal oscillator, a Phase Locked Loop circuit, and a power amplifier. The high-frequency power generated by the high-frequency source is supplied to the first electrode 1 and the second electrode 2 via, for example, a coaxial cable.

The basic peripheral circuit configuration of the electromagnetic wave generator of the present embodiment is such that a high-frequency signal generated by a Phase Locked Loop circuit is amplified by a power amplifier and fed to the first electrode 1 and the second electrode 2. When a large number of sets of the first electrode 1 and the second electrode 2 are used, for example, one power amplifier may be used for one set of the first electrode 1 and the second electrode 2, and electromagnetic waves may be individually generated by dividing the output of the Phase Locked Loop circuit and transmitting the output to the power amplifier. Further, a plurality of power amplifiers may be used, and in such a case, the amplification factor of each power amplifier can be individually controlled more easily.

2. Ink Dryer

The electromagnetic wave generator of the above embodiment can be used as an ink dryer. The ink dryer is the above-described electromagnetic wave generator, in which the first electrode and the second electrode 2 are disposed in parallel with respect to the thin ink film, and by applying a high-frequency voltage, the thin ink film can be heated very efficiently.

Figure 7:
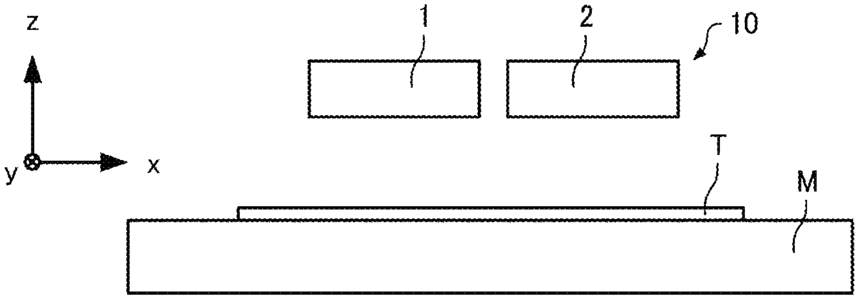
FIG. 7 is a schematic diagram of a disposition of a first electrode and a second electrode of an ink dryer with respect to a thin ink film as viewed from the side.

FIG. 7 is a schematic diagram of a disposition of the first electrode 1 and the second electrode 2 with respect to the thin ink film T as viewed from the side in the ink dryer 10 of the present embodiment. Since the ink dryer 10 is the same as the above-described electromagnetic wave generator 10, the same reference numerals as in the above description are assigned and the duplicated description is omitted.

2.1. Thin Ink Film

The thin ink film dried by the ink dryer 10 is a thin film obtained by attaching ink to a sheet such as paper or a film, a thin film obtained by attaching ink to a surface of a molded body having a three-dimensional shape or the like. The method for attaching the ink is not particularly limited, but may be an ink jet method, a spray method, a coating method using a brush, or the like. In the illustrated example, a thin ink film T formed by attaching ink on one side of a recording medium M using the ink jet method is illustrated.

The thickness of the thin ink film T is, for example, 0.01 μm or more and 100.0 μm or less, desirably 1.0 μm or more and 10.0 μm or less. Various components may be contained in the ink, and examples of components to be dried by the ink dryer include water and an organic solvent. When water is contained in the ink, the frequency of the electromagnetic wave radiated from the ink dryer 10 is desirably from 1 MHz to about 30 GHz. In particular, the frequency is desirably set to 2.45 GHz used in a microwave oven, because the legal standard is clear.

The principle that the water in the ink is heated by the electromagnetic waves with which the ink film is irradiated is frictional heat generated by vibration of the water molecules due to the dielectric heating, and/or Joule heat generated by eddy current generated in the water. When the ink is an ink having a high ion concentration, such as dye ink, conductivity is generated, so that the effect of heating by Joule heat increases. In the ink dryer 10 of the present embodiment, since a vibration electric field is applied in parallel to the thin ink film T, both heating principles can be used.

2.2. Heating Mechanism

When electromagnetic waves (3 GHz) are incident on the surface of the water, although it depends on the temperature, the depth reached by the electromagnetic wave is substantially 1.2 cm at 20° C. This depth is called the skin depth. As described above, the thickness of the thin ink film is extremely thin as compared with the penetration depth of the electromagnetic wave. Therefore, when the thin ink film is irradiated with the electromagnetic wave perpendicularly, almost all electromagnetic waves penetrate, and water in the thin ink film can hardly be heated, or even when it can be heated, the efficiency becomes very poor.

According to a preliminary experiment conducted by the inventor, it has been found that even when a heating operation is performed with a sheet having the ink attached thereto in a microwave oven (microwave oven), the ink can hardly be heated. It is considered that the reason is that, the power, among the power of the electromagnetic waves with which the thin ink film is irradiated, that turns into heat inside the ink is very low by the electromagnetic wave penetrating the ink thin film.

As described above, the electromagnetic wave generator of the present embodiment generates a near electromagnetic field. That is, by disposing the thin ink film to the ink dryer at an appropriate distance, it is possible to irradiate in a narrow range around the thin ink film with the electromagnetic waves with concentration. Since the electromagnetic wave generated from the ink dryer of the present embodiment presents only in a nearby narrow space and has a very weak distant electromagnetic field, energy is less dissipated, and by appropriately disposing the thin ink film in the area where electromagnetic waves present, the thin ink film can be heated very efficiently.

Figure 8:
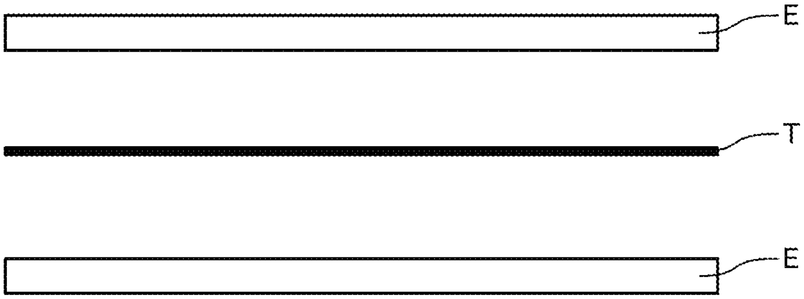
FIG. 8 is a schematic diagram showing an aspect in which a thin ink film is disposed between parallel plate electrodes.
Figure 9:
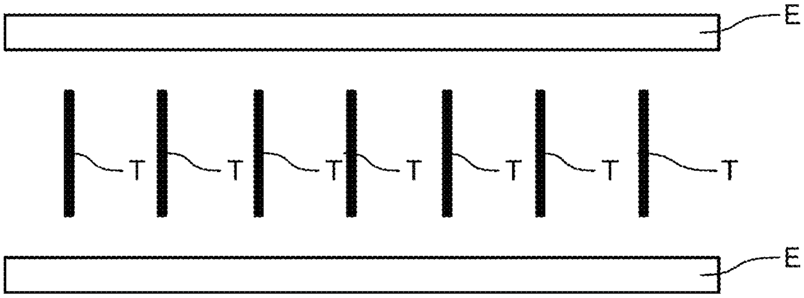
FIG. 9 is a schematic diagram showing an aspect in which a thin ink film is disposed between the parallel plate electrodes.
Figure 10:
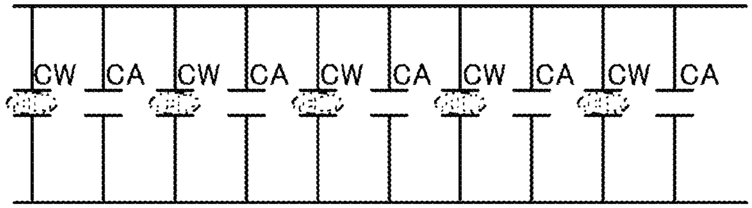
FIG. 10 shows an example of an equivalent circuit when a thin ink film is disposed between the parallel plate electrodes.

The mechanism of heating the thin ink film T by the ink dryer 10 will be described below. FIGS. 8 and 9 are schematic diagrams showing a mode in which the thin ink film T is disposed between the parallel plate electrodes E. FIG. 10 is an example of an equivalent circuit when the thin ink film T is disposed between the parallel plate electrodes E.

As shown in FIG. 8, when the thin ink film T is provided between the parallel plate electrodes E in parallel with the electrodes, even when a high-frequency voltage is applied to the parallel plate electrode E, the energy absorbed by the thin ink film T is very small. However, as shown in FIG. 9, when the thin ink film T is provided between the parallel plate electrodes E and perpendicular to the electrodes, the thin ink film T is heated very efficiently. Even with a thin ink film having the same volume and the same thickness, the heating efficiency can be increased 100 times by changing the direction of the thin ink film surface from horizontal to vertical with respect to the electrode.

FIG. 10 shows an equivalent circuit in the disposition shown in FIG. 9. As shown in FIG. 10, when the thin ink film T is provided between the parallel plate electrodes E and perpendicular to the electrodes, it is considered that this is equivalent to a circuit in which a capacitor CW where a space between the electrodes is filled with water and a capacitor CA where a space between the electrodes is filled with air are coupled in parallel. When a high-frequency voltage is applied in this circuit, the current and the electric field concentrate on the capacitor CW because the capacity of the capacitor CW is larger than the capacity of the capacitor CA. When the thin ink film T is made parallel to the direction of the electric field, the effect of increasing the distance that the electromagnetic wave passes through the thin ink film T and the effect of concentrating the electric field can be obtained, and the thin ink film can be heated very efficiently.

By forming the electric field in parallel with the thin ink film T, the heating efficiency of the thin ink film T is improved. Therefore, it is desirable that the direction of the electric field is as parallel as possible to the thin ink film T, and in the ink dryer 10 of the present embodiment, the first electrode 1 and the second electrode 2 having a structure capable of applying such an electric field are adopted. Further, as the electric field of the electromagnetic wave with which the thin ink film T is irradiated increases, the amount of heat generated by the thin ink film T increases. Since the electric field increases as the potential difference between the electrodes increases, the potential difference can be increased by disposing the coil 3 as described above. The coil 3 has an effect of impedance matching in addition to the effect of increasing the potential difference. Further, since the coil 3 itself generates an electric field, the coil 3 is disposed near the first electrode 1 or the second electrode 2, and the electric field generated by the coil 3 is added to the electric field generated between the electrodes to enhance the electric field and improve the heating efficiency.

2.3. Disposition of Electrode

The first electrode 1 and the second electrode 2 may be disposed perpendicular to the thin ink film T. For example, in the above-described electromagnetic wave generator 14, when the conductor 32 and the first electrode 1 are integrally formed and the conductor 30 and the second electrode 2 are integrally formed, the first electrode 1 becomes a columnar electrode, the second electrode 2 becomes a cylindrical electrode, and the extending direction becomes a direction of a normal line of the thin ink film T. In this case, when the electromagnetic wave generator 14 is installed so as to face the thin ink film T, the first electrode 1 and the second electrode 2 are disposed with respect to the thin ink film T in a posture in which the extending direction extends in a direction perpendicular to the surface where the thin ink film T spreads. Even with such a disposition, the thin ink film T can be efficiently heated.

2.4. Conductor Plate

Figure 11:
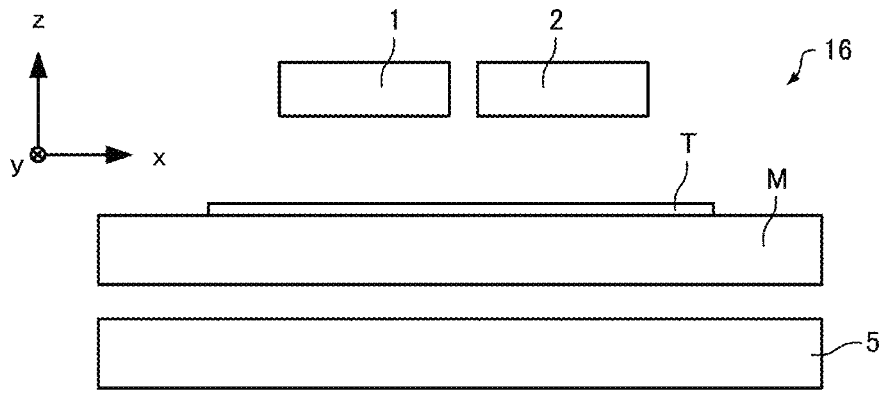
FIG. 11 is a schematic diagram of the vicinity of electrodes and a disposition of a conductor plate of the ink dryer according to the embodiment, as viewed from the side.

The ink dryer of the present embodiment may include a conductor plate. FIG. 11 is a schematic diagram of the vicinity of the electrodes of the ink dryer 16 provided with the conductor plate 5 and the disposition of the conductor plate as viewed from the side. The conductor plate 5 is disposed in parallel with the opposite side of the first electrode 1 and the second electrode 2 with respect to the thin ink film T. The conductor plate 5 is disposed at a position overlapping the first electrode 1 and the second electrode 2 in plan view. The thickness and plane size of the conductor plate 5 are not particularly limited.

The conductor plate 5 has conductivity. The conductor plate 5 is disposed to face the first electrode 1 and the second electrode 2 with the thin ink film T interposed therebetween, and thus it is possible to suppress a change in impedance of the ink dryer 16 due to the thin ink film T. Since the thin ink film T is regarded as a part of the capacitor C, the impedance of the ink dryer 10 changes depending on the thickness, volume, conductivity, and the like of the thin ink film T. In the above-described ink dryer 10 having no conductor plate 5, energy can be transmitted to the thin ink film T very efficiently, but the change in impedance of the ink dryer 10 becomes large.

The ink dryer 16 can suppress such a change in impedance by disposing the conductor plate 5. Further, by disposing the conductor plate 5, the energy may be transmitted to the thin ink film T more efficiently.

Regarding the conductor plate 5, for example, when the ink dryer 16 is provided in an ink jet printer, the platen can be formed of a conductive material and set as the conductor plate 5.

2.5. Operation Effect

According to the ink dryer of the present embodiment, the heating efficiency, that is, the ratio of the power, among the high-frequency power input to the antenna, used for increasing the temperature of the ink can be increased to 80% or more. According to the ink dryer of the present embodiment, the generated electromagnetic waves can be present only in a very limited area around the thin ink film. Thereby, the heating efficiency of the thin ink film is very good.

Since the ink dryer of the present embodiment uses a small electromagnetic wave generator having a minimum separation distance of 1/10 or less of the wavelength of the electromagnetic wave, the ink dryer can be used with saving the power and a simple shield can be used even when it becomes necessary to suppress the scattering of electromagnetic waves. Further, since the power is saved, a circuit for generating a high-frequency voltage can be downsized.

Since the ink dryer of the present embodiment utilizes the near electromagnetic field, it is possible to suppress the propagation of the energy to an object such as a sheet on which the thin ink film is attached. Therefore, for example, even when the sheet is made of a material that is affected by the temperature, the sheet is not easily heated, so that the deterioration of the sheet can be suppressed.

3. Ink Jet Printer

Figure 12:
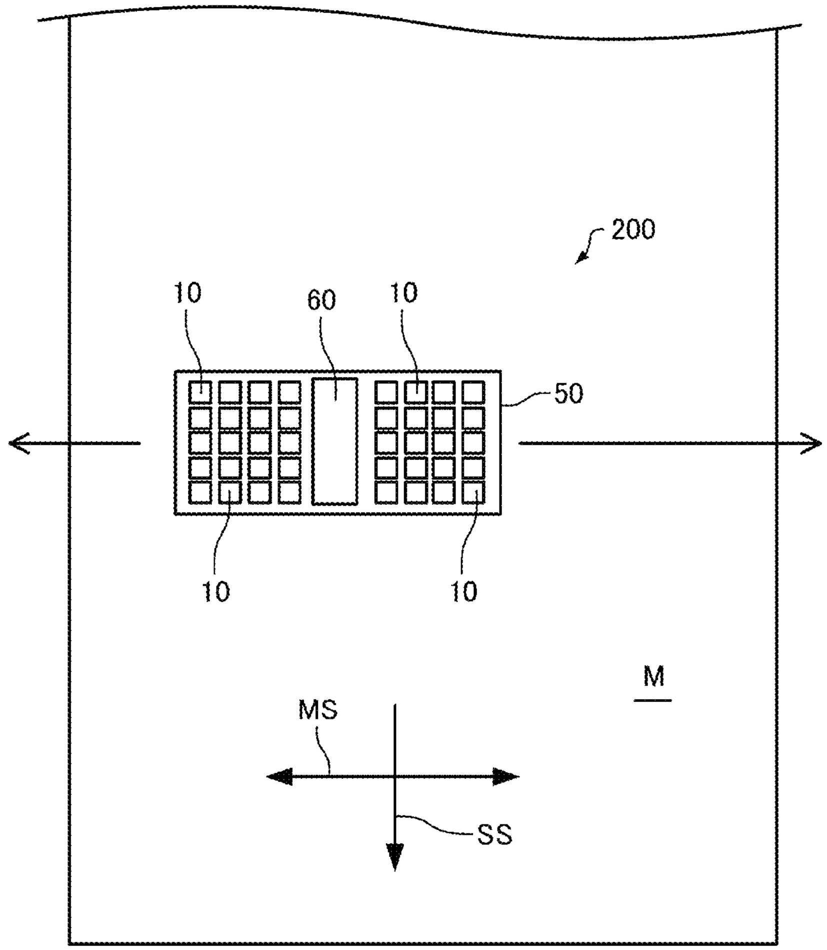
FIG. 12 is a schematic diagram of a main part of an ink jet printer according to the embodiment.

The ink jet printer of the present embodiment includes the above-described ink dryer, a carriage that reciprocates in the width direction of a recording medium, and an ink jet head that discharges ink, and the ink dryer and the ink jet head are mounted on the carriage. FIG. 12 is a schematic diagram of a main part of the ink jet printer 200 of the present embodiment. FIG. 12 shows a carriage 50 and a recording medium M. The ink jet printer 200 includes an ink dryer 10 and the carriage 50.

The ink jet printer 200 includes an ink jet head 60 on the carriage 50 and a plurality of ink dryers 10. A first electrode 1, a second electrode 2, and a coaxial cable 4 of the ink dryer 10 are mounted on the carriage 50. Although not shown, the ink jet printer 200 includes a high-frequency source for driving each of the ink dryers 10. Further, although not shown, the plurality of ink dryers 10 are arranged so as to cover an area equal to or longer than the length of a nozzle row of the ink jet head 60 in a moving direction SS of the recording medium M. The ink jet printer 200 is a serial type printer, and has a mechanism for moving the recording medium M and a mechanism for performing a reciprocation operation of the carriage 50.

The ink jet printer 200 forms a predetermined image on the recording medium M by repeating moving and disposing the recording medium M at a predetermined position and a plurality of times, and discharging ink from the ink jet head 60 while scanning the carriage 50 in a direction intersecting the moving direction SS of the recording medium M and attaching the ink to a predetermined position on the recording medium M with a predetermined amount, a plurality of times.

The ink dryer 10 is arranged in the carriage 50 on one side or both sides of the ink jet head 60 in the scanning direction MS of the carriage 50. In the illustrated example, a plurality of ink dryers 10 are arranged on both sides of the ink jet head 60 in the scanning direction MS. With this arrangement, the ink discharged from the ink jet head 60 and attached to the recording medium M to form a thin ink film can be dried quickly in a short time after a lapse of time in accordance with a moving speed of the carriage 50 and a distance from the nozzle of the ink jet head 60 to the ink dryer 10 in the scanning direction MS.

In FIG. 12, the ink dryers 10 are arranged in four rows on both sides of the ink jet head 60 in the scanning direction MS of the carriage 50. This is because, under the condition that 9 W of high-frequency power is input to the ink dryer 10 for drying the thin ink film 1/20 second is required, whereas the time required for the 5 mm ink dryer 10 to pass a specific coordinate at 1 m/s is 1/200 second, which is short of 1/20 second. The ink heating range of the 5 mm ink dryer 10 is set to 12.5 mm×12.5 mm, and by arranging four of ink dryers 10, the range of 50 mm×50 mm can be heated simultaneously. Since it takes 1/10 second for the 50 mm ink dryer 10 to pass the specific coordinates, the time required for drying can be secured.

In FIG. 12, the ink dryer 10 are arranged in five rows in a direction perpendicular to the scanning direction MS of the carriage 50. This is because the nozzle row of the ink jet head 60 has a length, and one ink dryer 10 of 5 mm×5 mm cannot cover the length. The length of the nozzle row is set to 70 mm, and the length is covered by arranging five ink dryers.

The ink jet printer 200 of the present embodiment is particularly effective when the recording medium M is made of a material such as a film to which the ink does not soak or hardly soaks. However, even with a recording medium M that absorbs ink such as paper, a sufficient drying effect can be obtained.

3.1. Deformation of Disposition of Electromagnetic Wave Generator

Figure 13:
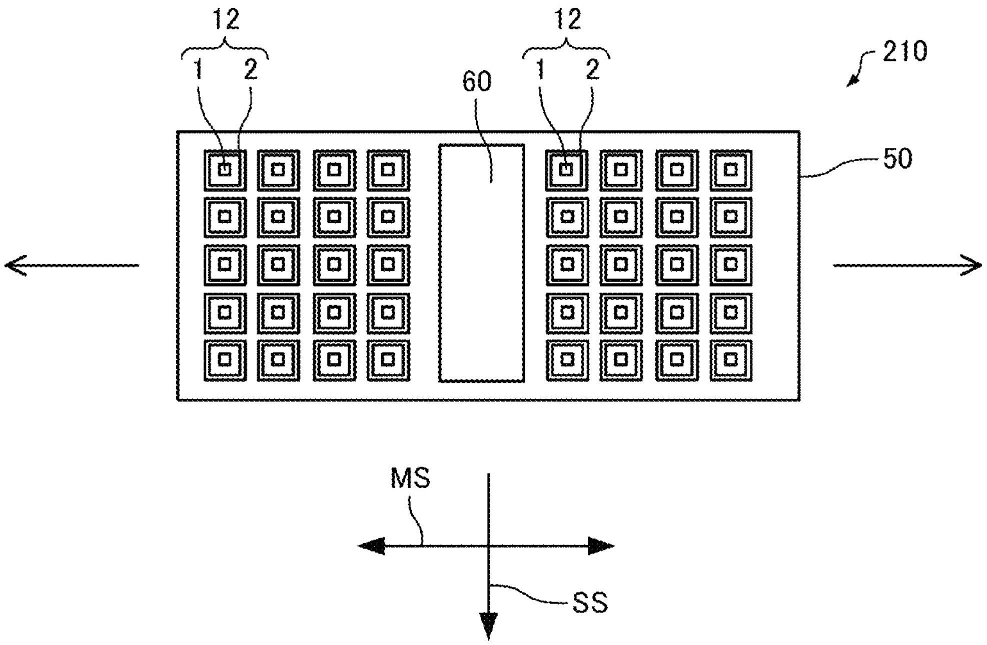
FIG. 13 is a schematic diagram of a main part of an ink jet printer according to a modification example.

FIG. 13 is a schematic plan view showing a carriage 50 of an ink jet printer 210 according to a modification example. In the ink jet printer 210, the electromagnetic wave generators 12 are arranged side by side in the direction in which the carriage 50 moves (the direction MS orthogonal to the moving direction SS of the recording medium M), and in the moving direction SS of the recording medium M, the electromagnetic wave generators 12 are arranged side by side.

In the ink jet printer 210, the electromagnetic wave generator 12 has a plane outer shape of a square, and a rectangular first electrode 1 and second electrode 2 are drawn. The minimum separation distance between the first electrode 1 and the second electrode 2 is as described above. The directions of the first electrode 1 and the second electrode 2 with respect to the direction MS in which the carriage 50 moves may be arranged in any manner. However, in order to irradiate a wide range of the electric field of the ink, it is better to increase an interval between the first electrode 1 and the second electrode 2. Although there is a gap between the electromagnetic wave generators 12, a gap may be provided to such an extent that the electromagnetic wave generators 12 are arranged such that there is no gap between the nearby electromagnetic fields generated from the electromagnetic wave generators 12.

The outer shape of the electromagnetic wave generator 12 is, for example, substantially 5 mm×5×height 8 mm, which is smaller than the plane size of the recording medium M. The drying speed of the thin ink film increases as the high-frequency power applied to the electromagnetic wave generator 12 increases. However, since the electromagnetic wave generator 12 itself generates heat due to the loss component of the electromagnetic wave generator 12, there are cases where there is a limit in increasing the high-frequency power to one electromagnetic wave generator 12.

Therefore, it may be necessary to irradiate the thin ink film with electromagnetic waves over a certain time or more. Therefore, in the illustrated shape of the electromagnetic wave generator 12, the passing through time of one electromagnetic wave generator 12 with respect to the carriage 50 in the moving direction MS may be insufficient, and a plurality of electromagnetic wave generators 12 are arranged in a total direction in the moving direction MS of the carriage 50 so as to increase the heating time of the thin ink film. Further, in the shape of the illustrated electromagnetic wave generator 12, five are arranged in the SS direction. This is to cover the entire area of the ink jet head 60 in the SS direction.

Figure 14:
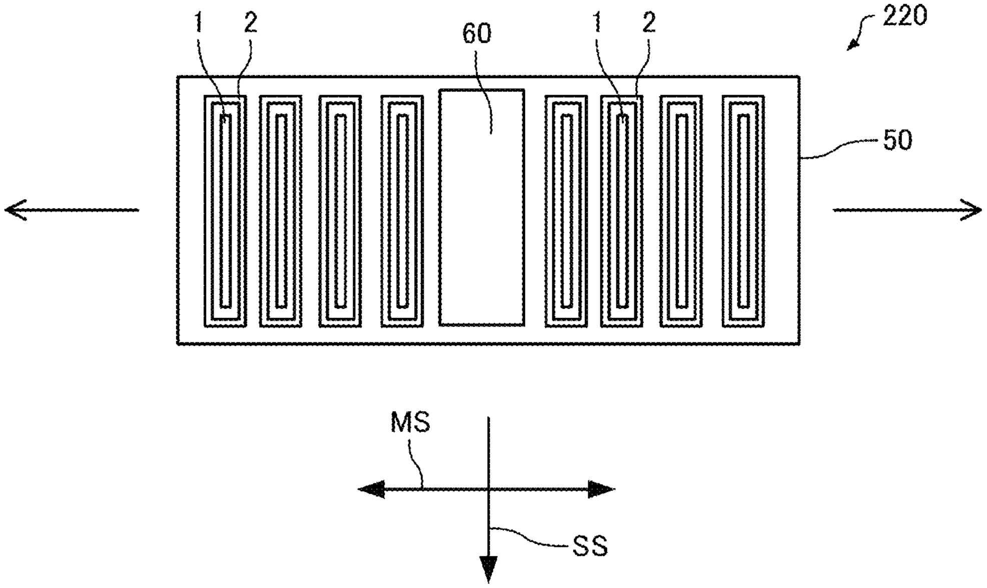
FIG. 14 is a schematic diagram of a main part of an ink jet printer according to a modification example.

FIG. 14 is a schematic plan view showing a carriage 50 of an ink jet printer 220 according to a modification example. In the ink jet printer 220, the electromagnetic wave generators are arranged side by side in the direction MS in which the carriage 50 moves.

In the ink jet printer 220, the plane outer shape of the electromagnetic wave generator is a rectangular shape extending in the moving direction SS of the recording medium M, and the first electrode 1 and the second electrode 2 having an elongated rectangular shape are drawn. The minimum separation distance between the first electrode 1 and the second electrode 2 is as described above. In the configuration in FIG. 14, the number of electromagnetic wave generators arranged in the moving direction of the recording medium M is smaller than that of the configuration in FIG. 13, and thus the control when the individual control of the electromagnetic wave generator is performed becomes easy, but the individual drying control for each small area according to the printing pattern is coarse.

Figure 15:
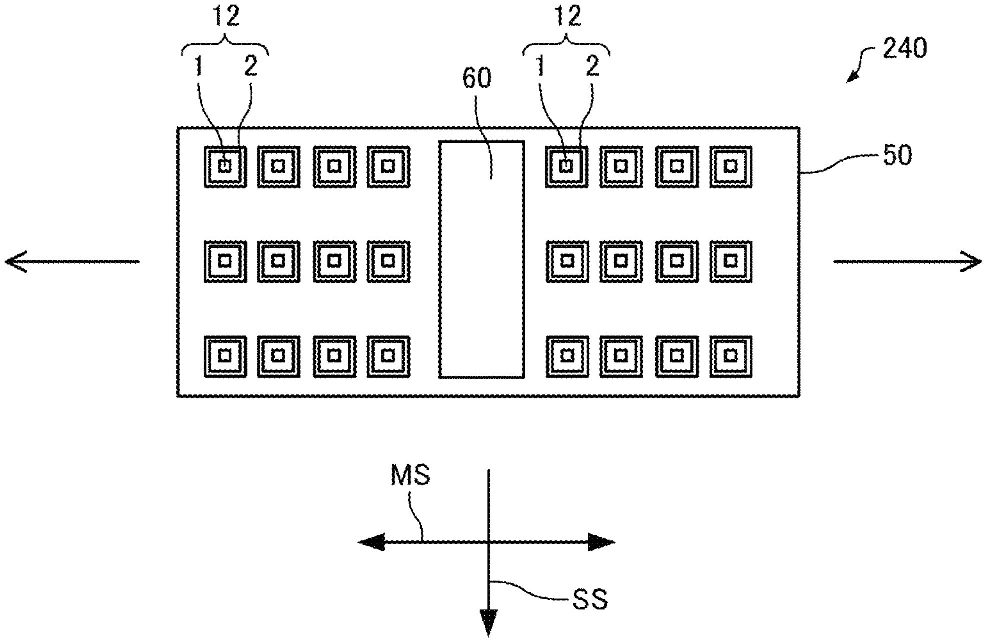
FIG. 15 is a schematic diagram of a main part of an ink jet printer according to a modification example.

FIG. 15 is a schematic plan view showing a carriage 50 of an ink jet printer 240 according to a modification example. In the ink jet printer 240, the electromagnetic wave generators 12 are arranged side by side in the moving direction MS of the carriage 50, and the electromagnetic wave generators 12 are arranged side by side at intervals in the moving direction SS of the recording medium M. In the illustrated example, the interval between the electromagnetic wave generators 12 in the moving direction SS of the recording medium M is substantially one time the length of the electromagnetic wave generator 12 in the direction SS intersecting the direction in which the carriage 50 moves. The electromagnetic wave generators 12 may be arranged at intervals of 0.2 times or more the length of the electromagnetic wave generator 12 in the direction SS intersecting the direction in which the carriage 50 moves.

With this arrangement, the area of the thin ink film to be heated can be thinned out in one scan of the carriage 50 during printing. Thereby, the area of the recording medium M heated together with the thin ink film in one scan can be dispersed. By dispersing the heated area of the recording medium M, the occurrence of warpage or wrinkling of the recording medium M may be suppressed.

Figure 16:
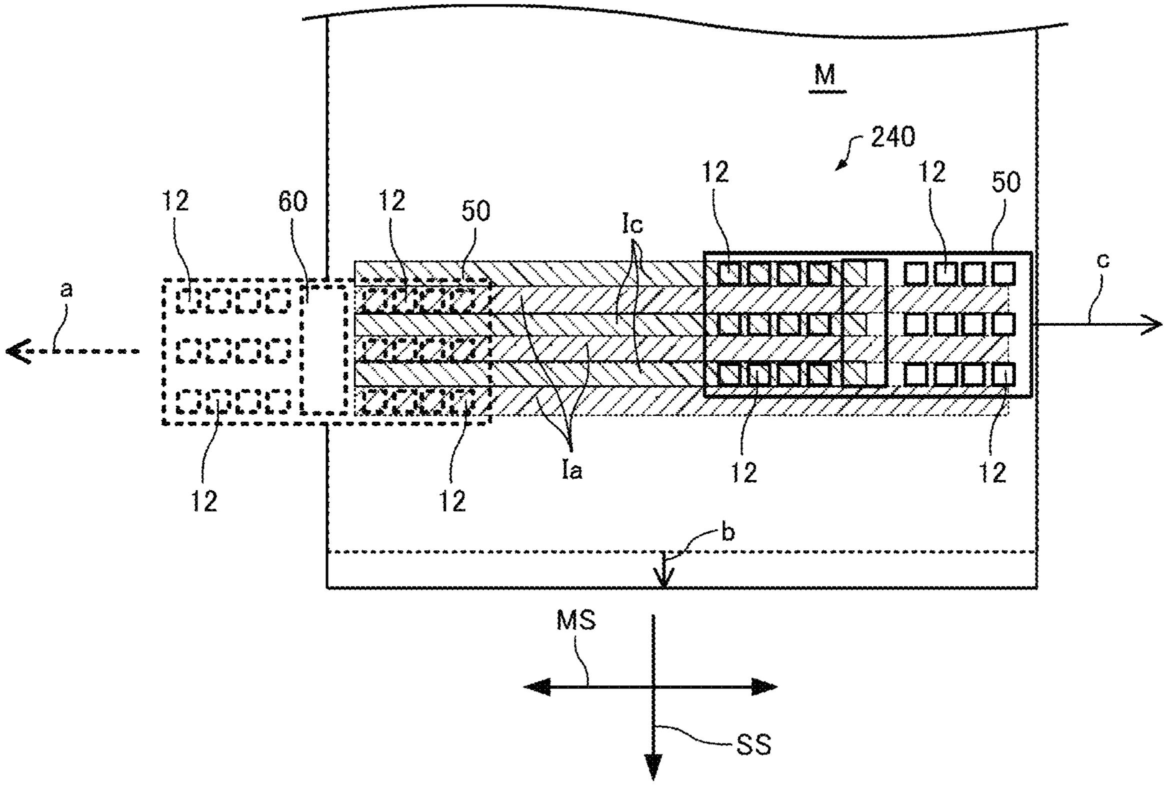
FIG. 16 is a schematic diagram showing an image formation by an ink jet printer according to a modification example.

FIG. 16 is a diagram for explaining an image formation by the ink jet printer 240 according to a modification example. In the ink jet printer 240, when forming an image, an area where the ink is not dried by the electromagnetic wave generator 12 in one scan of the carriage 50 is formed, and then the ink in an area not dried by the other scan is dried by the electromagnetic wave generator 10. After that, the movement of the carriage 50, the ink jet head 60, and the recording medium M is controlled so that the electromagnetic wave generator 12 passes through the entire surface of the image to be formed.

An example of a recording mode will be described with reference to FIG. 16. In the figure, the configuration indicated by a broken line shows a state of the first scan, and the configuration indicated by a solid line shows a state of the next scan. First, as indicated by the dashed arrow a, in the first scan of the carriage 50, ink is attached from the ink jet head 60 to an image area Ia, and the ink in the image area Ia is dried by the electromagnetic wave generator 12. At this time, the electromagnetic wave generator 12 does not heat the area other than the image area Ia, and a striped image area Ia corresponding to the arrangement of the electromagnetic wave generator 12 is formed.

Next, the recording medium M is moved in the moving direction SS, as indicated by an arrow b in the figure. The moving distance of the recording medium M is a distance at which the row of the electromagnetic wave generators 12 is positioned in an image non-formed area existing between a plurality of image areas Ia. Next, as indicated by an arrow c in the figure, in the second scan of the carriage 50, ink is attached from the ink jet head 60 to an image area Ib, and the ink in the image area Ib is dried by the electromagnetic wave generator 12. At this time, the electromagnetic wave generator 12 does not heat the area other than the image area Ib, and a striped image area Ib corresponding to the arrangement of the electromagnetic wave generator 12 is formed.

In this way, the electromagnetic wave generator 12 can pass through the entire surface of a predetermined image. Thereby, the area of the recording medium M to be heated is dispersed, and the occurrence of warpage or wrinkles of the recording medium M can be suppressed.

Although not shown, a similar effect can be expected even when the electromagnetic wave generator 12 is arranged downstream of the ink jet head 60 in the moving direction SS of the recording medium M. Furthermore, for example, a similar effect can be obtained by arranging the electromagnetic wave generator 12 as in the ink jet printer 210 in FIG. 13 and operating only the electromagnetic wave generator 12 at a position corresponding to the arrangement of the electromagnetic wave generators 12 of the ink jet printer 240 shown in FIG. 15.

The present disclosure is not limited to the embodiments described above, and various modifications are possible. For example, the present disclosure includes substantially the same configurations, for example, configurations having the same functions, methods, and results, or configurations having the same objects and effects, as the configurations described in the embodiments. Further, the present disclosure includes a configuration obtained by replacing non-essential portions in the configurations described in the embodiments. Further, the present disclosure includes a configuration that exhibits the same operational effects as those of the configurations described in the embodiments or a configuration capable of achieving the same objects. The present disclosure includes a configuration obtained by adding the configurations described in the embodiments to known techniques.

What is claimed is:

1. An ink jet printing system comprising:

an electromagnetic wave generator including an electromagnetic wave generation section that generates an electromagnetic wave, a high-frequency voltage generation section that generates a voltage applied to the electromagnetic wave generation section, and a transmission line that electrically couples the electromagnetic wave generation section and the high-frequency voltage generation section to each other in which the electromagnetic wave generation section includes a first electrode, a second electrode, a first conductor that electrically couples the first electrode and the transmission line to each other, and a second conductor that electrically couples the second electrode and the transmission line to each other, one of the first electrode or the second electrode is a reference potential electrode to which a reference potential is applied and the other is a high-frequency electrode to which a high-frequency voltage is applied, and the first conductor further includes a coil, and the coil is disposed at a position closer to the first electrode than the transmission line, and a substrate; and an ink jet head discharging ink, wherein the first electrode and the second electrode are formed above the substrate.

2. The ink jet printing system according to claim 1, wherein a minimum separation distance between the first electrode and the second electrode is 1/10 or less of a wavelength of an output electromagnetic wave, a minimum separation distance between the first conductor and the second conductor is 1/10 or less of a wavelength of an output electromagnetic wave.

3. The ink jet printing system according to claim 1, wherein the substrate is an insulator.

4. The ink jet printing system according to claim 1, wherein the substrate is transparent to electromagnetic waves.

5. The ink jet printing system according to claim 1, wherein the substrate has a material with low dielectric loss tangent.

6. The ink jet printing system according to claim 1, further comprising:

a memory storing an optimum value in accordance with the information on the thin ink film, wherein the control section controls the constant of the second coil or the constant of the capacitor of the impedance matching circuit with reference to the optimum value.

7. The ink jet printing system according to claim 1, wherein the information on the thin ink film is selected from a printing pattern, an amount of the ink, a type of the ink, and a combination thereof.

* * * * *